United States Patent [19]

Kawachi

[11] 4,011,513
[45] Mar. 8, 1977

[54] TUNING DEVICE FOR A RADIO RECEIVER

[75] Inventor: Manabu Kawachi, Tokyo, Japan

[73] Assignee: Pioneer Electronic Corporation, Tokyo, Japan

[22] Filed: Mar. 19, 1976

[21] Appl. No.: 668,382

[30] Foreign Application Priority Data

Mar. 20, 1975 Japan .................. 50-36646[U]
July 21, 1975 Japan .................. 50-100179[U]

[52] U.S. Cl. .................. 325/312; 325/352; 74/10 R
[51] Int. Cl.² .................. H04B 1/06
[58] Field of Search .......... 325/310, 312, 314, 352, 325/355, 356, 360; 74/10 R, 10 A, 10.2; 64/1 C, 8, 17 R, 23; 116/124.1 A, 124.2 R, 124.2 A; D56/4 B

[56] References Cited

UNITED STATES PATENTS

| 1,591,417 | 7/1926 | Flocco | 74/10 A |
| 2,036,948 | 4/1936 | McNary | 74/10 A |
| 3,908,399 | 9/1975 | Durno et al. | 64/1 C |
| 3,962,748 | 6/1976 | Michaels | 74/10 A |
| D109,040 | 3/1938 | Feitler | 325/352 |

Primary Examiner—Richard Murray
Assistant Examiner—Jin F. Ng
Attorney, Agent, or Firm—Sughrue, Rothwell, Mion, Zinn & Macpeak

[57] ABSTRACT

A tuning device for a radio receiver is disclosed wherein the manual knob which permits tuning and permits viewing of a radio frequency scale can be pivoted to face the operator directly. The manual knob is rotatably linked to a shaft of a tuning element, such as a variable capacitor or a variable inductance, by a coupling means including at least one universal joint.

7 Claims, 9 Drawing Figures

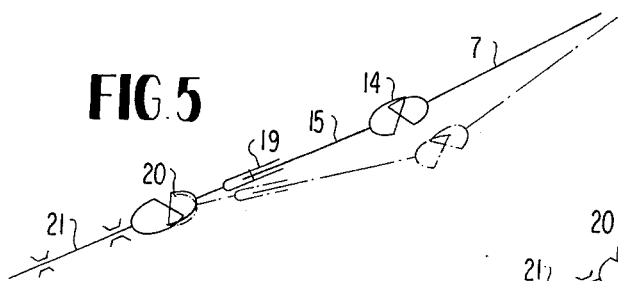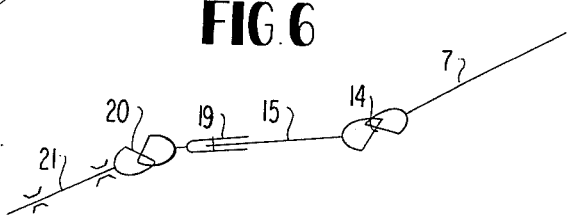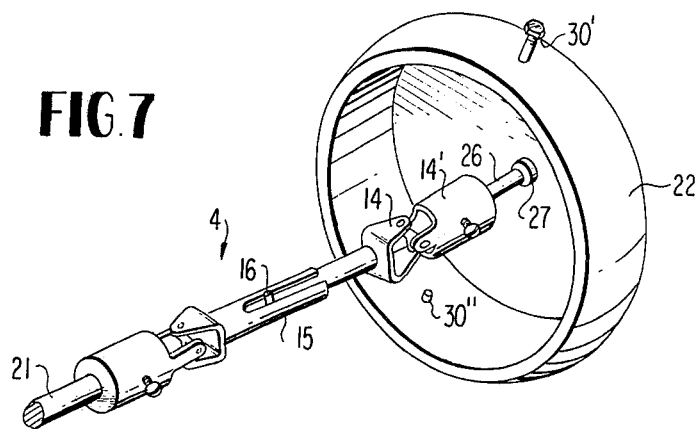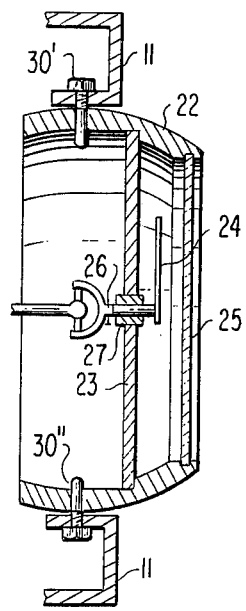

TUNING DEVICE FOR A RADIO RECEIVER

BACKGROUND OF THE INVENTION

1. Field of the Invention

This invention relates to a tuning device for radio receiver of the type which is mounted on the dashboad of a car.

2. Description of the Prior Art

Generally, a radio receiver used in an automobile is installed at a position on the dashboad which is a short distance to the right or left of the driver. Moreover, a tuning device is fixedly assembled to the receiver and directly connected to the shaft of a tuning element, such as variable capacitor or variable inductance. Therefore, when the driver, sitting in the driver's seat, wants to select a desired radio station frequency, the driver has to move his body toward the direction of the radio in order to get a full view of the tuning dial and tuning scale.

SUMMARY OF THE INVENTION

It is therefore a main object of the present invention to provide an improved tuning device having a dial which can be pivoted to face different directions.

Another object of the present invention is to provide a coupling means for faithfully transmitting the rotation of a tuning pointer to the shaft of a tuning element.

These and other objects, features and advantages of the invention will become more apparent upon a reading of the following detailed specification and drawings.

BRIEF DESCRIPTION OF THE DRAWING

FIG. 7 is a rear perspective view showing another embodiment of a tuning device of the present invention, and FIG. 8 is a cross-section view showing the structure of a tuning device shown in FIG. 7.

DESCRIPTION OF THE PREFERRED EMBODIMENT

Figure 1A:
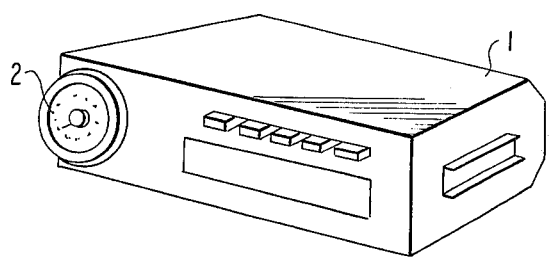
FIG. 1 (a) and (b) are perspective views of an embodiment of the present invention applied to a conventional car radio receiver.
Figure 1B:
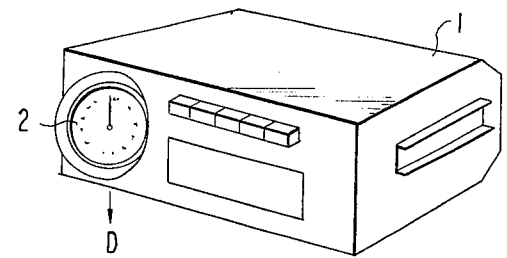

Referring to the attached drawings, in FIGS. 1(a) and 1(b), numeral 2 designates a tuning device applied to a conventional car radio receiver 1.

Figure 2:
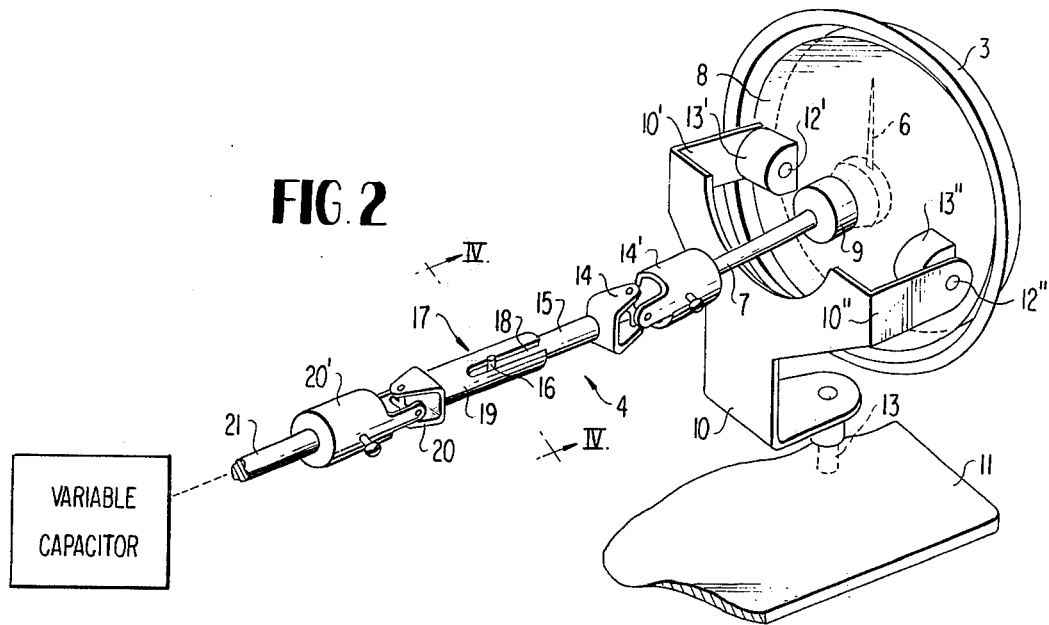
FIG. 2 is a rear perspective view showing a structure of a tuning device of the present invention.
Figure 3:
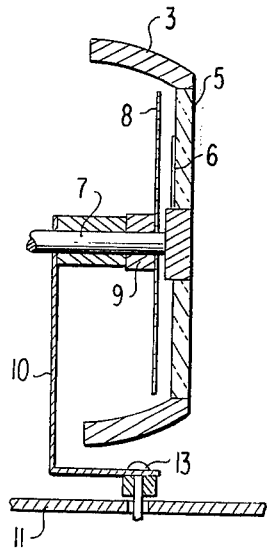
FIG. 3 is a cross-sectional view showing the tuning device shown in FIG. 2.
Figure 4:
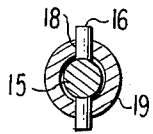
FIG. 4 is a vertical section of an expansion and contraction coupling of IV—IV in FIG. 2, FIGS. 5 and 6 are principle view showing the operation of the tuning device of the present invention.

FIGS. 2 and 3 show the detailed structure of a preferred embodiment of the present invention. In this embodiment, a dial gauge portion is composed of a scale plate 8, a bearing 9 secured to the scale plate 8, a transparent cover 5 and a tuning pointer 6 associated with a shaft 7 to be supported by the bearing 9. A support member 10 has at its lower portion a pin 13 for rotatably engaging with a chassis 11. The upper portion thereof is branched into two portions 10' and 10''. The scale plate 8 is provided with a bearing 9 at its center through which the shaft 7 is fitted, and two projections 13' and 13'' symmetrical with respect to the center. Moreover, the projections 13' and 13'' rotatably join with the branched portions 10' and 10'' by means of pins 12' and 12''.

One end of the shaft 7 is fixed to a center portion of a transparent cover 5 and the other end is connected to a shaft 21 of a tuning element, such as a variable capacitor or a variable inductance, through a coupling means 4. The transparent cover 5 is provided with a frame 3, functioning as a tuning knob, or a peripheral surface thereof and with a tuning pointer extended in the radial direction. Further, the coupling means 4 is composed of a first universal coupling 14 having a shaft 15 with a pin 16 secured thereto at one side and a connecting member 14' secured to the other side. A second universal coupling 20 has an outer cylinder 19 with a groove 18 attached at one side, and a connecting member 20' attached to the other side. In assembling, a first universal coupling 14 is connected to a second universal coupling 20 so that the shaft 15 is freely engaged with the outer cylinder 19 and slidably moves therein in the longitudinal direction, thereby consituting an expansion-and-contraction coupling 17.

In operation, when the operator is in a position such that he must look at the tuning dial from an angle, and therefore cannot easily see the markings of plate 8 or the pointer 6, he simply pivots the dial apparatus about the pin 13 until the dial face directly faces the operator. The dial can also be pivoted about pins 12' and 12'' for upward or downward tilting.

Referring to FIGS. 5 and 6, when the shaft 7 moves to a position shown by the dotted line as a result of the dial being pivoted to face the direction of an arrow D as shown in FIG. 1(b), the coupling means 4 also moves in accordance with the movement thereof, as shown in the dotted line. Accordingly, the distance between the universal couplings 14 and 20 elongates. However, the coupling means is constructed so as to carry out an expansion and contraction operation, and accordingly, the dial gauge portion can be freely pivoted in the desired direction. Thereafter, because of the universal joints 14 and 20 and pin 16, the rotation of the tuning knob can be faithfully transmitted to the shaft 21 of the variable capacitor. Moreover, the device is arranged so that the shaft 7 and the shaft 21 are positioned on the same line as shown in FIGS. 2 and 5 or parallel to each other, as shown in FIG. 6, when the dial face is parallel to the receiver front wall.

FIGS. 7 and 8 show another embodiment of the tuning device of the present invention, in which a tuning knob is arranged on a chassis independently of the tuning device. In this embodiment, a scale plate 23 has at its center a bearing 27 in which a shaft 26 having a tuning pointer 24 is rotatably supported. The other end of the shaft 26 is connected to a shaft 21 of a tuning element through a coupling means 4. A transparent cover 25 having a frame 22 is arranged with the scale plate 23 so as to be fitted in parallel to each other. Further, the frame 22 is provided with two holes which ar symmetric with respect to the shaft 26, being pivotably mounted on a chassis 11 by means of supporting means such as a pair of pins 30' and 30'', Moreover the coupling means is constructed in the same way as in the first embodiment of the present invention.

In this embodiment the tuning shaft is rotated by another non-pivoting dial on the radio chassis. Conventional mechanical linkage is used. The novel dial and scale arrangement according to this embodiment is used only for viewing.

As constructed above, the tuning device can be horizontally pivoted to the desired direction by means of the provision of a pair of pins 30' and 30" and the coupling means. In addition, even if the driver is in any position, the rotation of one shaft can be faithfully transmitted to the other, with the result that the desired broadcasting station frequency can be easily and accurately selected.

Moreover, as the screw pins 30' and 30" are secured to chassis 11, and the shaft 21 of the tuning element is pivotably fixed to the tuning element, which is also secured to chassis, the facing direction of the tuning device does not move due to vibration of the car.

In this embodiment, in case that the first universal coupling 14 is arranged on the line connecting the screw pins 30' and 30", it is not necessary to provide the second universal coupling and the expansion and contraction mechanism because the distance between the universal coupling 14 and the variable capacitor does not change even if the direction of the dial gauge portion changes.

What is claimed is

1. In a radio receiver having a body, a tuning element with a tuning shaft coupled thereto, and a manually controlled tuning dial having tuning indicating means associated therewith, the improvement comprising, means for pivotally attaching said tuning dial and tuning scale to said body to permit said dial and scale to be pivoted to face various selected directions, and rotational coupling means, including at least one universal coupling, connecting said dial to said tuning shaft to permit rotation of said dial to be transferred to said shaft regardless of the facing direction of said dial and scale.

2. A radio receiver as claimed in claim 1 wherein said tuning dial comprises, a hand held portion for rotating said dial, a dial shaft connected to the hand held portion, and a tuning pointer affixed to the shaft, said scale plate positioned rotatably on said dial shaft by means of a bearing thereon, and wherein said means for pivotally attaching comprises rotatable connecting means rotatably connected to said body at one end thereof and connected to said scale at the other end thereof to permit pivoting of said dial and said tuning scale and to prevent rotation of said scale, the pivoting of said scale being transferred to said dial via said bearing and dial shaft.

3. A radio receiver as claimed in claim 2 wherein said rotational coupling means comprises, a first universal coupling having one end connected to said dial shaft, a second universal coupling having one end connected to said tuning shaft, and means axially slidably connecting the other ends of said first and second universal couplings for permitting said rotational coupling means to be axially extended and contracted.

4. A radio receiver as claimed in claim 3 wherein said rotatable connecting means is rotatably connected to said tuning scale to permit pivoting of said tuning scale relative to said rotatable connecting means about a first pivoting axis which is perpendicular to the axis of rotation of said rotatable connecting means.

5. A radio receiver as claimed in claim 4 wherein said axially slidably connecting means comprises, a shaft having a pin secured thereto at one side thereof, and a cylindrical member fitted around said shaft and having an axial groove therein for receiving said pin whereby rotation of said shaft is imparted to said cylindrical member via said pin and groove.

6. In a radio receiver of the type having a body and tuning shaft, a tuning scale viewing device comprising, a dial frame, a scale plate fixed to said dial frame, a bearing in said scale plate and a pointer shaft extending through said bearing, a pointer affixed to said shaft on the outer side of said scale plate, a universal coupling means coupling said pointer shaft on the inner side of said scale plate to said tuning shaft, and a means pivotally connecting said dial frame to said body for permitting said dial frame to be pivoted about an axis which intersects said universal coupling means.

7. A radio receiver as claimed in claim 6 wherein said means pivotally connecting comprises, a pair of connecting pins attaching opposite points on said dial frame to said body, said opposite points being in a straight line including said universal coupling.

* * * * *